3,441,541
FULLY CAPPED POLYMETHYLENE POLYPHENYL ISOCYANATES
Victor V. D'Ancicco, 4456 Timberlane Drive, Kalamazoo, Mich. 49001, and Adnan A. R. Sayigh, 999 Hartford Turnpike Road, North Haven, Conn. 06473
No Drawing. Continuation-in-part of application Ser. No. 508,129, Nov. 16, 1965. This application Oct. 17, 1966, Ser. No. 586,961
Int. Cl. C08f 45/72; C08g 51/76
U.S. Cl. 260—77.5     1 Claim

ABSTRACT OF THE DISCLOSURE

Polymethylene polyphenyl isocyanate mixtures containing from about 35 to about 85 percent by weight of methylenebis(phenylisocyanate) and having each isocyanate group capped with a thermally releasable capping agent having active hydrogen directly attached to nitrogen, are disclosed. Preferred capping agents are ε-caprolactam, 2-pyrrolidone, and polymeric 1,2-dihydro-2,2,4-trimethylquinoline. The capped isocyanates are useful in aqueous latex systems, as promoters in curing hydrocarbon high polymers, as components of storage stable polyurethane compositions, and in reducing the tendency of nylon cord to flat spot.

---

This invention relates to novel derivatives of polyisocyanates and is more particularly concerned with polymethylene polyphenyl isocyanates wherein each of the isocyanate groups has been capped with a thermally releasable capping agent.

This application is a continuation-in-part of application Ser. No. 508,129 filed November 16, 1965, now abandoned.

The novel compounds of the invention are fully capped polyisocyanates which comprise a polymethylene polyphenyl isocyanate mixture containing from about 35 to about 85 percent by weight of methylenebis(phenyl isocyanate) the remainder of said polyisocyanate being polymethylene polyphenyl isocyanates of functionality higher than 2.0, wherein each of the isocyanate groups of said polymethylene polyphenyl isocyanate has been capped with a thermally releasable capping agent in which the active hydrogen atom is attached directly to nitrogen.

It is already known that polyisocyanates having a functionality of 2.0 or higher can be partially blocked by a variety of heat releasable capping agents; see, for example, U.S. Patents 2,683,727, 2,683,728, 2,683,729, 2,698,845, 2,725,385 and 2,733,261. Such partially blocked isocyanates of this latter kind i.e. polyisocyanates in which at least one isocyanate group is still present in the free state and at least one isocyanate group is blocked by a thermally releasable capping agent, are useful in controlled chemical reactions in which, in a first step, the free isocyanate group enters into reaction with a compound having an active hydrogen containing group and, in a subsequent stage, the capped isocyanate group can be regenerated by heating and is then available for further reaction with a second active hydrogen containing group. For example, the partially blocked isocyanates can be used as crosslinking agents for polyurethanes. By virtue of the free isocyanate group the blocked isocyanate can be incorporated into the chain of an elastomeric polyurethane derived from a diisocyanate and the appropriate polyol by conventional techniques. By subsequently heating the resulting polyurethane at a temperature at which the blocked isocyanate groups are regenerated crosslinking of said elastomer can be achieved. In this manner, by employing the appropriate amounts of partially blocked isocyanate it is possible to achieve any desired amount of crosslinking in the resulting polyurethanes.

Partially blocked isocyanates of the above type known in the prior art are not, however, useful in systems in which the components are stored in contact with each other prior to use, e.g., in aqueous systems or, indeed, in any system which has present a component having one or more active hydrogen atoms (as determined by the Zerewitinoff method, J. Am. Chem. Soc. 49, 3181, 1927). Canadian Patent 671,042 shows the use of fully capped polyisocyanates as components of aqueous latex systems which are used to treat paper, the treated paper being subsequently heated at a temperature sufficient to regenerate the free isocyanate groups. Said Canadian patent discloses a large number of diisocyanates, triisocyanates and higher functional isocyanates which can be used in combination with a wide variety of capping agents. Said Canadian patent does not disclose the use of mterials obtained by fully capping polyisocyanates which polyisocyanates are polymethylene polyphenyl isocyanates derived by phosgenation of a mixture of methylene bridged polyphenyl polyamines.

We have now found that certain novel, fully capped polyisocyanates, namely those obtained by capping, with a thermally releasable capping agent in which the active-hydrogen atom is attached directly to nitrogen, a polymethylene polyphenyl isocyanate containing from about 35 to about 85 percent by weight of methylenebis(phenyl isocyanate) the remainder of said mixture of polymethylene polyphenyl isocyanate being polymethylene polyphenyl isocyanates of functionality higher than 2.0, possess properties which render them useful for a variety of purposes and which serve to distinguish them from both the partially capped and the fully capped polyisocyanates hitherto known in the art.

For example, the fully capped polyisocyanates of the invention can be used in aqueous systems which are stored for prolonged periods prior to use, illustratively in aqueous latex systems such as those described in Canadian Patent 671,042, supra, for the treatment of paper. When used for the latter purpose, illustratively using the procedure described in said Canadian patent, the capped polyisocyanates yield impregnated paper having significantly greater strength than that obtained using the capped polyisocyanates described in the aforesaid patent.

Further, the capped polyisocyanates of the invention can be used as promoters in the curing of hydrocarbon high polymers, i.e. polymers in which the recurring unit has a hydrocarbon chain, such as natural rubber, butyl rubber, SBR rubbers, polyisoprene, polybutadiene, polyacrylonitrile, neoprene, polyethylene, ethylene-propylene copolymers, ethylene-propylene terpolymers, copolymers of butadiene and acrylonitrile, copolymers of butadiene and methyl methacrylate, and the like. The capped polyisocyanates of the invention are particularly useful as adjuvants in the curing of filled hydrocarbon high polymers especially when a mineral filler such as natural clay is employed.

The cured hydrocarbon high polymers produced by curing in the presence of capped polyisocyanates of the invention have physical properties which show significant improvement, particularly in regard to tensile strength, elongation, modulus and permanent set, compared with the corresponding cured polymers produced by curing in the absence of the capped polyisocyanates of the invention. The procedures employed in using the compounds of the invention in the curing of hydrocarbon high polymers are essentially those known in the art (see, for example, Vulcanization of Elastomers, edited by G. Alliger and I. J. Sjothum, Reinhold Publishing Corporation, New York, 1964) the only additional step being the addition of from about 1 percent to about 10 percent by weight based on uncured polymer of a compound of this invention to the compounding mix prior to curing.

In further illustration of the usefulness of the capped polyisocyanates of the invention the latter can be used in the preparation of elastomeric polyurethanes and more particularly can be used in the preparation of storage stable compositions adapted to prepare polyurethane coating compositions. For example, a fully capped polyisocyanate of the invention can be formulated with an appropriate polyol such as a linear hydroxyl-terminated polyester in solution in a solvent such as those conventionally employed in the preparation of varnishes and the like. The resulting composition is stable on storage for prolonged periods and, at any desired time, can be applied to any surface required to be coated and can be cured by heating to a temperature at which the blocked isocyanate groups are regenerated. The resulting polyurethane coatings are superior, particularly in resistance to heat and in toughness and flexibility, to those obtained by methods hitherto employed in the coating art.

In yet a further illustration of the usefulness of the capped polyisocyanates of the invention the latter can be used to overcome, or reduce, the tendency of nylon cord to form "flat-spots." The latter is a phenomenon familiar to all motorists having automobiles fitted with tires reinforced with nylon cord. When an automobile having such tires is allowed to stand for any significant length of time the deformation of each tire caused at the area of contact with the pavement gives rise to a temporary deformation or flat spot in the nylon cord reinforcement; the flat spot persists for a short period after the automobile is again set in motion. This gives rise to the familiary drumming noise which is observed under these circumstances. The flat spotting of the nylon cord can be overcome or reduced by treatment of the nylon cord with a capped polyisocyanate of the invention. The treatment can be accomplished conveniently by admixture of the capped polyisocyanate with the molten nylon prior to spinning or with nylon granules prior to melt extrusion of the latter using procedures well-known in the art. The amount of capped polyisocyanate so incorporated into the nylon filament is generally within the range of about 1% to about 15% by weight, although lower or higher amounts can be used in certain cases.

The polyisocyanates which are employed in the preparation of the fully capped polyisocyanates of the invention are well-known in the art. They are obtained by phosgenation of the corresponding mixtures of methylene-bridged polyphenyl polyamines obtained by interaction of formaldehyde, hydrochloric acid, and primary aromatic amines, for example, aniline, o-chloroaniline, o-toluidine, and the like; see, for example, U.S. Patents 2,683,730, 2,950,263, and 3,012,008; Canadian Patent 700,026; and German specification 1,131,877.

Said polyisocyanates generally contain from about 35 to about 85 percent by weight of polymethylene polyphenyl isocyanates the remainder of said mixture being polymethylene polyphenyl isocyanates of functionality higher than 2.0.

Said polyisocyanates can be represented by the following general formula

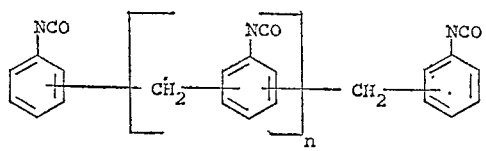

wherein $n$ has an average value of about 0.2 for mixtures containing approximately 85 percent by weight of methylenebis(phenyl isocyanates), about 0.7 for mixtures containing approximately 50 percent by weight of methylene-bis(phenyl isocyanates), and about 1.0 for mixtures containing approximately 35 percent by weight of methylene-bis(phenyl isocyanates). The above formula represents the product derived by phosgenation of the appropriate mixture of methylene bridged polyphenyl polyamines obtained from aniline and formaldehyde. When a substituted aniline is employed as starting material in the preparation of the polyamine the resulting polyisocyanate will carry the appropriate substituent in each of the phenyl nuclei.

The proportions of the various polymethylene polyphenyl isocyanates in the polyisocyanate of the above formula corresponds to the proportions of methylene bridged polyphenyl amines in the intermediate mixture of polyamines which is phosgenated. The desired proportion of methylene bridged polyphenyl amines in said mixture is generally controlled by varying the ratio of aniline, or other aromatic amine, to formaldehyde in the initial condensation. For example, using a ratio of approximately 4 moles of aniline to 1.0 mole of formaldehyde there is obtained a mixture of polyamines containing approximately 85% by weight of methylenedianilines. Using a ratio of approximately 4 moles of aniline to about 2.6 moles of formaldehyde there is obtained a mixture of polyamines containing approximately 35% by weight of methylenedianilines. Mixtures of polyamines containing proportions of methylenedianiline intermediate between these limits can be obtained by appropriate adjustment of the ratio of aniline to formaldehyde.

The average functionality of polyisocyanates prepared from the above types of polyamine varies from a low of about 2.2 for polyisocyanates derived from polyamines containing approximately 85 percent by weight of methylenedianilines, through a value of about 2.7 for polyisocyanates derived from polyamines containing approximately 50% by weight of methylenedianilines, to a high of about 3.0 for polyisocyanates derived from polyamines containing about 35 percent by weight of methylenedianilines. The average functionality of any particular polyisocyanate is represented by the following:

Average functionality=
$$\frac{\text{number average molecular weight}}{\text{isocyanate equivalent}}$$

The number average molecular weight can be determined experimentally, for example, by gel permeation chromatographic analysis see, for example, J. C. Moore, J. Polymer Sci. 2A, 835, 1964, and the equivalent weight can be determined experimentally by conventional techniques employing reaction of a measured amount of isocyanate with excess di-n-butylamine followed by back-titration of excess amines; see, Polyurethanes, Dombrow, Reinhold Publishing Corporation 1957; appendix.

The thermally releasable capping agents, which are employed to cap each of the free isocyanate groups in the above polyisocyanates and thereby produce the novel compounds of the invention, are a well-known group of compounds which contain an active hydrogen atom or atoms, in the Zerewithinoff sense as defined above, attached directly to a nitrogen atom. By virtue of said active hydrogen atom these capping agents react with an isocyanate to give an adduct which is stable in that it shows no tendency to react with active hydrogen containing groups at temperatures of the order of 20° C. up to about 100° C. but which, upon heating at temperatures within the range of about 100° C. to about 200° C., dissociates into its component parts thereby regenerating the free isocyanate group or groups.

Examples of active-hydrogen atom containing compounds which can be employed as capping agents as defined above are:

Lactams, for example ε-caprolactam, δ-valerolactam, γ-butyrolactam (2-pyrrolidone), β-propiolactam, and the like;

Imides, for example succinimide, phthalimide, naphthalimide, glutarimide, carbamide, and the like;

N-monosubstituted aliphatic acid amides, for example N - methylacetamide, N - ethylacetamide, N-methylbutyramide, N-isopropylacetamide, N-methyloctanoamide, and the like;

Secondary aromatic amides, for example, diphenylamine, N-phenyl β-naphthylamine, N-phenyl α-naphthylamine, o-ditolylamine, m-ditolylamine, p-ditolylamine, N-phenyltoluidine, N-phenylxylidine, 2,2′-dinitrodiphenylamine, 2,2′-dichlorodiphenylamine, p-nitrosodiphenylamine, 5,10-dihydroacridine, N-phenyl-N′-isopropyl - p-phenylenediamine, N,N′-diphenyl-p-phenylene diamine, 1,2-dihydroquinoline, 1,2-dihydro - 2,2,4-trimethylquinoline and polymerized 1,2 - dihydro - 2,2,4-trimethylquinoline available under the trademark Agerite Resin D which is prepared by heating monomeric 1,2-dihydro-2,2,4 - trimethylquinoline at about 100–150° C. in the presence of aqueous hydrochloric acid according to the procedure such as shown by United States Patent 2,451,174, 6-ethoxy-1,2-dihydro - 2,2,4 - trimethylquinoline, carbazole and the like.

The capping of the polyisocyanate with the capping agent to produce the fully capped polyisocyanates required for the process of the invention is accomplished readily by bringing together the two components, if desired in the presence of an inert organic solvent such as benzene, toluene, xylene, chlorobenzene, dichlorobenzene, and the like. Preferably the capping agent is employed in an amount which represents a slight excess (from about 1 to about 5% by weight) over that required theoretically to cap each of the free isocyanate groups in the polyisocyanate. In many cases the isocyanate and the capping agent will react rapidly and readily without the need to apply external heat. If desired, the reaction mixture can be heated to enable the reaction to proceed at an appropriate rate and temperatures up to about 100° C. are generally satisfactory for this purpose. The progress of the reaction can be followed by suitable analytical procedures, for example, by infrared spectroscopic analysis, the end point in the latter case being indicated by the disappearance of IR bands attributable to the isocyanate group.

The novel compounds of the invention are inclusive of fully capped polyisocyanates in which two or more different capping agents as defined above have been employed. Thus, by partially capping a polyisocyanate with one capping agent, and completing the capping in one or more steps by reacting the remaining free isocyanate groups with a second and different capping agent or with two or more such different capping agents in sequence, there are obtained polyisocyanates in which a multiplicity of different capping agents have been employed. Alternatively the uncapped polyisocyanate can be reacted in one step with a mixture of two or more different capping agents.

The novel fully capped polyisocyanates of the invention are useful for a variety of purposes as discussed above. Further the usefulness of a novel compound of the invention can often be enhanced by choosing, as capping agent, an active hydrogen compound falling within the class of capping agents defined above which, in addition, is a compound normally employed for a separate and distinct purpose, based on a property unrelated to that of capping agent, in the medium in which the capped polyisocyanate is to be used. For example, the capped polyisocyanates of the invention are useful as promoters in the curing of hydrocarbon high polymers such as those exemplified hereinabove. In the compounding of such hydrocarbon high polymers by conventional methods there are employed a number of adjuvants which are, in many cases, compounds containing active hydrogen atoms attached directly to nitrogen and which can be employed in preparing the novel compounds of the invention.

Illustratively, various secondary amines such as 6-ethoxy-1,2-dihydro-2,2,4-trimethylquinoline and polymerized forms of the latter (for example, that which is available under the name Agerite® Resin D) are frequently employed as antioxidants in the compounding of said hydrocarbon high polymers, particularly with mineral filled polyolefins such as polyethylene, polypropylene and the like. These secondary amine antioxidants can also be employed as capping agents in preparing the compounds of the invention. Hence it is possible, in accordance with the invention, to provide novel fully capped polyisocyanates for the compounding of hydrocarbon polymers which capped polyisocyanates not only generate free isocyanate during the heat curing of said polymers but also generate an antioxidant conventionally employed in the compounding procedure.

It will be appreciated that, when employing a compound of the invention in a double role such as that outlined above, due regard must be taken of the amount of capping agent generated by heat dissociation. Where the amount of capping agent generated would be in excess of that which is desirable or which is generally employed when the capping agent is employed in its conventional role in the compounding, appropriate adjustments can be made, for example by using a blend of suitable proportions of an isocyanate capped with the compound which fills the double role and an isocyanate capped with an agent which is inert in the environment in which it is generated in the compounding.

Of the novel compounds provided by the present invention on which has been found to possess especially useful properties is that derived by capping with a lactam, particularly ε-caprolactam, each free isocyanate group of a polyisocyanate derived by phosgenation of a mixture of methylene bridged polyphenyl polyamines containing from about 45 to about 60% by weight of methylenedianilines, the remainder of said mixture of polyamines being triamines and polyamines of higher molecular weight. In common with all the novel compounds of the invention this particular group of compounds is useful in the curing of hydrocarbon high polymers using the procedures discussed above and is especially effective for this purpose giving rise to cured hydrocarbon high polymers of significantly enhanced physical properties particularly in regard to tensile strength, elongation, modulus, and permanent set.

The following examples describe the manner and process of making and using the invention and set forth the best mode contemplated by the inventors of carrying out the invention but are not to be construed as limiting.

EXAMPLE 1

The polyisocyanate employed as starting material in the following procedure was PAPI® a polymethylene polyphenyl isocyanate of equivalent weight 133 and average functionality of about 2.7 (based on molecular weight analysis by gel permeation chromatography) containing approximately 50% by weight of methylenebis(phenyl isocyanate) the remainder of said mixture being polymethylene polyphenyl isocyanates of higher functionality.

A total of 600 g. (5.39 equiv.) of ε-caprolactam was heated at about 80° C. until molten and to the melt was added portionwise, with stirring, a total of 660 g. (4.96 equiv.) of PAPI®. The temperature rose to a maximum of 137° C. during the addition. The resulting product was cooled at room temperature (circa 25° C.) to obtain caprolactam-capped polymethylene polyphenyl isocyanate, a brown brittle resin having a softening point of 75 to 80° C.

EXAMPLE 2

A total of 268 g. (3.15 equivalents) of 2-pyrrolidone was heated to 70° C. until molten and to the melt was added portionwise with stirring, a total of 400 g. (3.0 equivalents) of PAPI®. The temperature of the mixture was maintained within the range of about 100 to 115° C. by cooling during the initial exothermic reaction and was then maintained at 140 to 150° C. by heating in the later stages of the addition. After the addition was complete the resulting mixture was cooled to room temperature (circa 25° C.) to obtain 2-pyrrolidone-blocked polymethylene polyphenyl isocyanate, a brown, brittle solid having a softening range of 100 to 110° C.

Using the above procedure, but replacing 2-pyrrolidone by the equivalent amount of δ-valerolactam, β-propiolactam, succinimide, phthalimide, naphthalimide, diphenylamine, N-phenyl-β-naphthalamine, p-ditolylamine, N-phenyltoluidine, N - phenylxylidine, p - nitrosodiphenylamine, N,N'-diphenyl-p-phenylenediamine, 1,2-dihydroquinoline, 1,2-dihydro-2,2,4-trimethylquinoline, polymerized 1,2-dihydro-2,2,4-trimethylquinoline, and N-methylacetamide, there are obtained the corresponding fully capped polymethylene polyphenyl isocyanates.

EXAMPLE 3

Using the procedure of Example 1, but replacing the polymethylene polyphenyl isocyanate employed as starting material by an equivalent amount of a polymethylene polyphenyl isocyanate of equivalent weight 130 and average functionality of 2.2 containing approximately 70% by weight of methylenebit(phenyl isocyanate) the remainder of said mixture being polymethylene polyphenyl isocyanates of higher functionality, there is obtained the corresponding ε-caprolactam capped polymethylene polyphenyl isocyanate.

EXAMPLE 4

Using the procedure described in Example 1, but replacing ε-caprolactam by an equivalent amount of AGERITE® Resin D (polymerized 1,2-dihydro-2,2,4-trimethylquinoline; softening point 74° C. minimum, specific gravity 1.06±0.03 there is obtained the corresponding AGERITE® Resin D capped polymethylene polyphenyl isocyanate. The latter fully capped polyisocyanate is useful as promoter in the curing of mineral filled polyethylene polymers using procedures well-known in the art (see, for example, Vulcanization of Elastomers, supra, chapter 9) and adding to the conventional compounding mixes from about 1 to about 10 percent by weight based on polyethylene of the above capped polyisocyanate.

We claim:
1. A fully capped polyisocyanate comprising a polymethylene polyphenyl isocyanate mixture containing approximately 50 percent by weight of methylene-bis(phenyl isocyanate) the remainder of said mixture of polymethylene polyphenyl isocyanates being polymethylene polyphenyl isocyanates of functionality greater than 2.0 wherein each of the isocyanate groups of said polyisocyanate has been capped with polymerized 1,2-dihydro-2,2,4-trimethylquinoline.

References Cited

UNITED STATES PATENTS

| 2,683,730 | 7/1954 | Seeger et al. | 260—453 |
| 2,801,990 | 8/1957 | Seeger et al. | 260—75 |
| 3,080,368 | 3/1963 | Wegler et al. | 260—251 |
| 3,211,585 | 10/1965 | Meyer et al. | 117—232 |
| 3,245,961 | 4/1966 | Fetscher et al. | 260—77.5 |
| 3,248,371 | 4/1966 | Damusis | 260—77.5 |
| 3,271,170 | 9/1966 | Ahlberg et al. | 106—36 |

FOREIGN PATENTS

| 665,495 | 6/1963 | Canada. |
| 874,430 | 8/1961 | Great Britain. |

OTHER REFERENCES

Chemical Abstracts, volume 53, number 2 (Jan. 25, 1959), page 1200, "Preparations and Reactions of Addition Compounds of Diisocyanates With Compounds Having Active Hydrogens."

Compounding Ingredients for Rubber, 3rd edition, published by Rubber World, page 117 (1961).

Agerite Antioxidants, Bulletin of R. T. Vanderbilt Co., 12 pages (September 1959).

DONALD E. CZAJA, *Primary Examiner.*

M. J. WELSH, *Assistant Examiner.*

U.S. Cl. X.R.

260—75, 78, 83.3, 83.5, 85.1, 85.5, 88.2, 88.7, 94.7, 94.9, 779, 859; 117—154, 155